March 10, 1964 E. V. RUDA 3,124,765

GENERATOR OF MODIFIED SAWTOOTH WAVEFORM

Filed Aug. 9, 1961

INVENTOR.
ERNEST V. RUDA

BY Spencer E. Olson

ATTORNEY 3,124,765

GENERATOR OF MODIFIED SAWTOOTH WAVEFORM

Ernest V. Ruda, East Amherst, N.Y., assignor to Sylvania Electric Products Inc., a corporation of Delaware Filed Aug. 9, 1961, Ser. No. 130,418
3 Claims. (Cl. 331—129)

This invention relates to waveform generating circuits, and more particularly to a circuit for producing a modified sawtooth waveform in which there is a relatively long "dwell" period between successive sweeps.

A number of circuits are known for producing linear sawtooth waveforms, among them being a vacuum tube circuit utilizing the Miller effect. Such circuits normally must be periodically switched or gated to return it to its starting condition, but other known sawtooth waveform generators are self-switching, or free-running, the period of the sawtooth wave in this case being determined by a suitable time constant circuit. A common characteristic of these prior art sawtooth generators, whether triggered or free-running, is the fact that each sweep excursion starts almost immediately following the termination of the preceding sweep to thereby produce a truly sawtooth waveform.

In some applications it is desirable to have a linear sweep signal in which there is a controllable time delay or "dwell" between the termination of one sweep and the beginning of the next. It is desirable, also, that the generator be free-running; that is, that the recurrent sweep signals be generated, with the desired waiting period between successive sweeps, without the application of external gating or triggering signals.

It is, accordingly, an object of this invention to produce a waveform generator for producing recurring sweep signals spaced apart by a predetermined time interval.

Another object of this invention is to provide a self-switching or free-running waveform generating circuit capable of generating a modified sawtooth waveform in which successive sweeps are spaced apart by a predetermined controllable time interval.

Another object of the invention is to provide a circuit having the foregoing characteristics wherein the slope and amplitude of the sweep signal, in addition to the spacing between successive sweeps, are readily adjustable.

Briefly, these objects are attained by connecting a gaseous discharge device, such as a grid-controlled thyratron across a storage capacitor which feeds a timing signal from the plate to the grid of the thyratron. Much as in prior art circuits, when the capacitance has charged to a predetermined point, the gaseous discharge device fires, thereby discharging the capacitance and returning the circuit to its initial starting condition. However, unlike prior art circuits, the present waveform generator includes circuit means coupled to the thyratron for maintaining the thyratron in the conducting state for a relatively long period after the thyratron is fired to terminate the sweep. The time that the thyratron is maintained conducting after firing, in spite of the tendency of the timing capacitor to recharge, is determined by another timing circuit including a capacitor and a resistor. This second timing capacitor is rapidly charged when the thyratron is fired, this potential being applied to keep the thyratron conducting until the second capacitor has discharged to a predetermined level. Together the two timing circuits determine the period of the sweep, and the "dwell" time between successive sweeps, no external triggering being necessary to produce the desired waveform.

Detailed operation together with further objects and features of the invention will be better understood by reference to the accompanying drawings in which.

Figure 1:
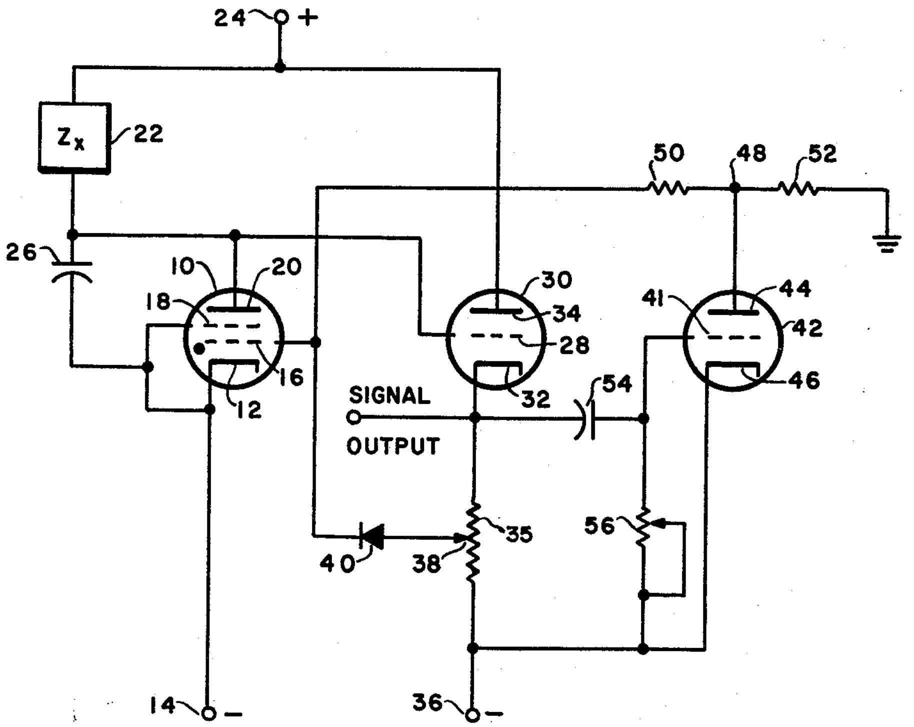
FIGURE 1 is a schematic diagram of a circuit embodying the invention.

Referring now to FIGURE 1, the circuit is basically a free-running sawtooth generator including a gaseous discharge tube 10, which is shown, by way of example, as a thyratron having a cathode 12 which is connected to a source of negative potential, represented by terminal 14, a control grid 16, a second grid 18 connected to the cathode, and a plate 20. The plate 20 is connected through a load impedance 22, designated $Z_x$, to a source of positive potential, represented by terminal 24. For the generation of a linear sweep, the load impedance $Z_x$ is a constant current device of which a number of forms are known to the art, or if good linearity is not required, $Z_x$ may simply be a resistor. The plate 20 is also connected through a charging capacitor 26 to the cathode 12 and second grid 18 of the thyratron.

The plate 20 of the thyratron is also connected to the control grid 28 of an electron discharge device 30, which is shown, by way of example, as a triode further including a cathode 32 and a plate 34. This triode is connected as a cathode-follower with its plate connected to the source of positive potential at terminal 24, and its cathode connected through resistor 35 to a second source of negative potential, more negative than source 14, represented by terminal 36. A variable tap 38 on resistor 35 is connected through a unidirectional conducting device 40, such as a diode, to the first grid of thyratron 10.

The cathode 32 of triode 30 is coupled to the control grid 41 of a second electron discharge device 42, which is shown, by way of example, as a triode further including a plate 44 and a cathode 46 connected to the negative source of potential 36. The plate 44 of this tube, which is connected as an amplifier, derives its energizing potential from point 48 on a voltage divider including resistors 50 and 52 connected from the first grid 16 of thyratron 10 to ground. The coupling circuit between the cathode-follower and the amplifier comprises a timing circuit including capacitor 54 and a resistor 56, connected from the control grid 41 of the amplifier to the cathode 32 of triode 30 and the source of negative potential 36 respectively.

Figure 2:
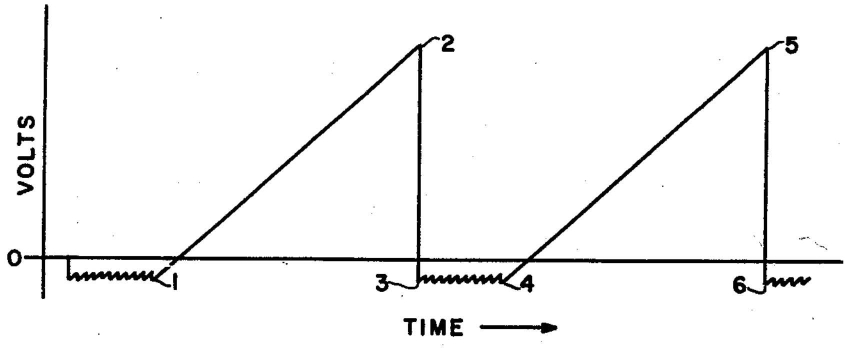
FIGURE 2 is the output waveform generated by the circuit.

Referring to the output waveform of FIGURE 2, which is derived from the cathode of cathode-follower 30, the operation of the circuit will now be described. Since the circuit is free-running, the description of its operation will arbitrarily be started at point 1 of the output waveform. At this point, thyratron 10 will have been fired some time previously and held in a conducting state for a predetermined "dwell" time. At the end of this "dwell" period, the anode of diode 40 is at a large negative value, determined by the location of tap 38 on resistor 35 and negative potential of source 36. The grid 41 of amplifier 42 is more positive than the cathode 46 with the result that the amplifier is conducting heavily, causing the plate 44 of the amplifier to be more negative than the anode of diode 40. As a result, diode 40 is forward-biased, and the first grid 16 of the thyratron is negative with respect to the cathode 12 thereby rendering the thyratron non-conducting.

With the thyratron non-conducting, a positive charge is built up on capacitor 26 through the load impedance 22, the voltage on the plate of the thyratron, and hence on the control grid of the cathode-follower, correspondingly increasing. Likewise, the voltage at the cathode of the cathode-follower increases to produce the linear sweep between points 1 and 2 of the output waveform of FIGURE 2, and causes the voltage on the anode of diode 40 to rise to a less negative value. Since diode 40 was forward-biased at the beginning of the sweep, the voltage on the grid 16 of the thyratron correspondingly rises. As the grid-cathode voltage of thyratron 10 approaches zero, the thyratron fires (at point 2 on the waveform), rapidly discharging capacitor 26. The resulting large negative-going pulse is directly coupled to the control grid of the cathode-follower and appears as the excursion from points 2 to 3 of the output waveform. This negative pulse is also applied through capacitor 54 to the grid 41 of amplifier 42, driving it to cutoff and holding it off by reason of the charge developed on capacitor 54. With no current flow in resistors 50 and 52 the grid 16 of the thyratron is at ground potential. The negative-going pulse at the cathode of the cathode-follower also causes the voltage on the anode of diode 40 to decrease, and since the cathode of the diode is at ground potential, the diode is reverse-biased to block current flow. At this point, the voltage on the grid 16 of the thyratron is slightly positive with respect to the cathode 12, resistor 50 limiting the grid current.

The hold-on time between points 3 and 4 on the output waveform, determined largely by the time constant of the circuit including capacitor 54 and resistor 56, will now be described. Since grid 16 of the thyratron is positive with respect to its cathode 12, the thyratron conducts at a very small anode voltage whereby capacitor 26 can accumulate only a small charge before the thyratron conducts to discharge capacitor 26. This fast charge-discharge cycle (illustrated as a ripple in the output waveform between points 3 and 4) continues until capacitor 54 discharges through resistor 56 to a potential which will again allow tube 42 to conduct. When tube 42 conducts, its anode, and hence the cathode of diode 40, is returned to a value more negative than the anode of diode 40. As a result, diode 40 is forward-biased, and the grid of the thyratron is negative with respect to the cathode, thereby turning off the thyratron and preventing it from being fired with a small buildup of charge on capacitor 26. Thus, the charge again builds up on capacitor 26, as previously described, to produce the excursion between points 4 and 5 on the output waveform.

From the foregoing description, it is seen that the thyratron 10 is "held" in a state to be rendered conducting by a very small voltage applied to its plate by the reverse-biased diode 40 which prevents the grid 16 of the thyratron from following the voltage at point 38 down after the thyratron fires, and by the timing circuit including capacitor 54 and resistor 56, which determines the hold time. The level to which capacitor 26 charges, and hence the amplitude of the output waveform, may be varied by adjusting the position of point 38 on resistor 35. Similarly, the "hold-on" or "dwell" time may be adjusted by varying the resistance of resistor 56. The slope, and hence the duration of the linear portion of the sweep, for a given setting of potentiometer 35, can be varied by adjusting the impedance of charging impedance 22.

In a circuit which has satisfactorily operated to generate an ouput waveform having a sweep duration of two seconds and a "dwell" time of one-half second, the circuit components and values were as follows:

| | |
|---|---|
| Tube **10** | Type 5643. |
| Tube **30** | Type 6111. |
| Tube **42** | Type 6112. |
| Diode **40** | Type 1N459. |
| Capacitor **26** | 1.0 microfarad. |
| Capacitor **54** | 0.47 microfarad. |
| $Z_x$ | Constant current. |
| Resistor **56** | 1 megohm. |
| Resistor **50** | 10K ohms. |
| Resistor **52** | 430K ohms. |
| Resistor **35** | 98K ohms, with 30K ohms between point **38** and cathode **32**. |
| Potential source **24** | +250 V. |
| Potential source **14** | —20 V. |
| Potential source **36** | —150 V. |

With these circuit values, the sweep excursion (point 1 to point 2) was from a value of —5 volts to +150 volts.

While there has been shown and described a specific embodiment of the invention, many modifications will now be suggested to ones skilled in the art. It is therefore intended that the invention not be restricted to the circuit details and components suggested or described except insofar as such limitations appear in the appended claims.

What is claimed is:

1. A circuit for generating a voltage waveform consisting of successive sweeps separated by a "dwell" period, comprising, a thyratron having a cathode, a control grid, and a plate, a first capacitor connected between said cathode and said plate, means connecting said plate to a source of positive potential through a load impedance, means biasing said thyratron to fire and thereby discharge said first capacitor to terminate a sweep when said first capacitor is charged to a predetermined potential, and a circuit for maintaining said thyratron conducting for a predetermined period after it is fired to thereby prevent recharging of said first capacitor, said last-mentioned circuit comprising a first electron tube having plate, control grid, and cathode electrodes and connected as a cathode-follower, means connecting the plate of said thyratron to the control grid of said first electron tube, a second electron tube having plate, control grid, and cathode electrodes and connected as an amplifier, a timing circuit including a second capacitor and a resistor coupling the cathode of said first tube to the grid-cathode circuit of said second tube, means resistively connecting the plate of said second tube to the control grid of said thyratron, and a unidirectional conducting device connected from the cathode circuit of said first electron tube to the control grid of said thyratron.

2. A circuit for generating a voltage waveform consisting of successive sweeps separated by a "dwell" period, comprising, a thyratron having a cathode, a control grid, and a plate, a first capacitor connected between said cathode and said plate, means connecting said plate to a source of positive potential through a load impedance, means biasing said thyratron to fire and thereby discharge said first capacitor to terminate a sweep when said first capacitor is charged to a predetermined potential, and a circuit for maintaining said thyratron conducting for a predetermined period after it is fired to thereby prevent recharging of said first capacitor, said last-mentioned circuit comprising a first electron tube having plate, control grid, and cathode electrodes, means connecting the plate of said first tube to said source of positive potential, means connecting the cathode to said first tube to a source of negative potential through a cathode load resistor, means connecting the plate of said thyratron to the control grid of said first tube, a second electron tube having plate, control grid, and cathode electrodes, means connecting the plate of said second tube to a voltage divider connected between the control grid of said thyratron and a source of reference potential, means connecting the cathode of said second tube to said source of negative potential, a timing circuit including a second capacitor and a resistor coupling the cathode of said first tube to the grid-cathode circuit of said second tube, and a diode connected from a point on said cathode load resistor to the control grid of said thyratron with its anode connected to said cathode load resistor.

3. A free-running circuit for generating a voltage waveform consisting of successive sweeps separated by a "dwell" period comprising, a thyratron having cathode, control grid, and plate electrodes, a first capacitor connected between the cathode and plate of said thyratron, means connecting the plate of said thyratron to a source of positive potential through a load impedance, means connecting the cathode of said thyratron to a first source of negative potential, said thyratron being fired in response to a predetermined charge on said first capacitor to discharge said first capacitor to terminate a sweep, and a circuit for maintaining said thyratron conducting and preventing recharging of said first capacitor for a predetermined period after said thyratron is fired, said circuit comprising first and second electron tubes each having cathode, control grid, and plate electrodes, means connecting the plate of said first tube to said source of positive potential, means connecting the cathode of said first tube to a second source of negative potential more negative than said first source through a cathode load resistor, means connecting the plate of said thyratron to the control grid of said first tube, means connecting the plate of said second tube to a voltage divider connected between the control grid of said thyratron and ground potential, means connecting the cathode of said second tube to said second source of negative potential, a second capacitor connected between the cathode of said first tube and the control grid of said second tube, a resistor connected between the control grid and cathode of said second tube, and a diode having an anode and a cathode with its anode connected to a point on said cathode load resistor and its cathode connected to the control grid of said thyratron.

References Cited in the file of this patent

UNITED STATES PATENTS

| | | |
|---|---|---|
| 2,709,747 | Gordon et al. | May 31, 1955 |
| 2,823,311 | Bastir | Feb. 11, 1958 |